(12) United States Patent
Mardall et al.

(10) Patent No.: US 8,557,416 B2
(45) Date of Patent: Oct. 15, 2013

(54) BATTERY PACK DIRECTED VENTING SYSTEM

(75) Inventors: Joseph Mardall, San Francisco, CA (US); Nicholas Hayden Herron, San Francisco, CA (US); Dustin Grace, San Carlos, CA (US); Weston Arthur Hermann, Palo Alto, CA (US); Jeffrey C. Weintraub, San Carlos, CA (US); Gary Allen Pinkley, Union City, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/475,966

(22) Filed: May 19, 2012

(65) Prior Publication Data

US 2012/0237803 A1 Sep. 20, 2012

Related U.S. Application Data

(63) Continuation-in-part of application No. 13/475,955, filed on May 19, 2012, which is a continuation-in-part of application No. 13/076,003, filed on Mar. 30, 2011, now Pat. No. 8,268,469, which is a continuation-in-part of application No. 12/798,198, filed on Mar. 30, 2010, now Pat. No. 8,277,965, which is a continuation-in-part of application No. 12/386,684, filed on Apr. 22, 2009.

(60) Provisional application No. 61/426,254, filed on Dec. 22, 2010.

(51) Int. Cl.
*H01M 2/12* (2006.01)
*H01M 2/08* (2006.01)
*H01M 2/02* (2006.01)
*H01M 10/50* (2006.01)
*B60K 1/04* (2006.01)

(52) U.S. Cl.
USPC .............. 429/53; 429/82; 429/163; 429/185; 180/65.1

(58) Field of Classification Search
USPC .................. 429/53, 82, 163, 185, 54, 56, 57, 429/148; 320/147; 180/65.1
See application file for complete search history.

(56) References Cited

U.S. PATENT DOCUMENTS 2,094,329 A 9/1937 Mascuch
3,166,446 A 1/1965 Hutchison
(Continued)

FOREIGN PATENT DOCUMENTS

CN 201 732 847 2/2011
EP 0 068 837 1/1983
(Continued)

*Primary Examiner* — Kenneth Douyette
(74) *Attorney, Agent, or Firm* — Patent Law Office of David G. Beck

(57) ABSTRACT

A thermal management system is provided that minimizes the effects of thermal runaway within a battery pack, the system using an integrated battery venting assembly comprised of an integrated exhaust port, a valve retention plate that covers the exhaust port and includes a plurality of retention plate ports, and a plurality of valves that are configured to seal the retention plate ports under normal conditions and unseal the retention plate ports during thermal runaway. As hot gas passes through the retention plate ports, the plate is configured to melt and be ejected, thereby allowing subsequent hot gas to pass through the larger exhaust port. A perforated cover plate may be used to protect the external surfaces of the retention plate and valves. An internally mounted exhaust guide may be used to direct the flow of hot gas expelled during the thermal runaway event.

19 Claims, 13 Drawing Sheets

(56) References Cited

U.S. PATENT DOCUMENTS

| | | |
|---|---|---|
| 3,201,284 A | 8/1965 | Ellis |
| 3,834,945 A | 9/1974 | Jensen |
| 4,482,613 A | 11/1984 | Turchan et al. |
| 4,804,593 A | 2/1989 | Hara et al. |
| 5,227,260 A * | 7/1993 | Rose et al. .................. 429/54 |
| 5,800,942 A * | 9/1998 | Hamada et al. ............... 429/148 |
| 6,278,259 B1 * | 8/2001 | Kimoto et al. ................ 320/147 |
| 6,300,003 B1 * | 10/2001 | Misra et al. .................. 429/100 |
| 2003/0070706 A1 | 4/2003 | Fujioka |
| 2005/0029986 A1 | 2/2005 | Morgan |
| 2005/0170238 A1 | 8/2005 | Abu-Isa et al. |
| 2006/0068278 A1 | 3/2006 | Bloom et al. |
| 2007/0178377 A1 | 8/2007 | Kim et al. |
| 2008/0050645 A1 | 2/2008 | Kai et al. |
| 2008/0220321 A1 | 9/2008 | Yonemochi et al. |
| 2008/0241644 A1 | 10/2008 | Crowe et al. |
| 2008/0318121 A1 | 12/2008 | Takagi |
| 2009/0068549 A1 * | 3/2009 | Hamada et al. .................. 429/56 |
| 2009/0081531 A1 * | 3/2009 | Yoda .............................. 429/57 |
| 2009/0220850 A1 | 9/2009 | Bitsche et al. |
| 2010/0136404 A1 | 6/2010 | Hermann et al. |
| 2010/0178552 A1 | 7/2010 | Kim et al. |
| 2010/0183910 A1 | 7/2010 | Nishino et al. |
| 2011/0027632 A1 | 2/2011 | Higashino et al. |

FOREIGN PATENT DOCUMENTS

| | | |
|---|---|---|
| EP | 2 161 768 A1 | 3/2010 |
| JP | 2004039358 A | 2/2004 |
| JP | 2006185894 | 7/2006 |
| WO | WO 2005122294 A1 | 12/2005 |

* cited by examiner

BATTERY PACK DIRECTED VENTING SYSTEM

CROSS-REFERENCE TO RELATED APPLICATION

This application is a continuation-in-part of U.S. patent application Ser. No. 13/475,955, filed 19 May 2012, which is a continuation-in-part of U.S. patent application Ser. No. 13/076,003, filed 30 Mar. 2011, now U.S. Pat. No. 8,268,469, which is a continuation-in-part of U.S. patent application Ser. No. 12/798,198, filed 30 Mar. 2010, now U.S. Pat. No. 8,277,965, which is a continuation-in-part of U.S. patent application Ser. No. 12/386,684, filed 22 Apr. 2009, the disclosures of which are incorporated herein by reference for any and all purposes. U.S. patent application Ser. No. 13/076,003, filed 30 Mar. 2011, now U.S. Pat. No. 8,268,469, claims the benefit of the filing date of U.S. Provisional Patent Application Ser. No. 61/426,254, filed 22 Dec. 2010, the disclosure of which is incorporated herein by reference for any and all purposes.

FIELD OF THE INVENTION

The present invention relates generally to batteries and, more particularly, to means for mitigating the effects and hazards associated with a battery undergoing thermal runaway.

BACKGROUND OF THE INVENTION

Batteries come in a wide variety of types, chemistries and configurations, each of which has its own merits and weaknesses. Among rechargeable batteries, also referred to as secondary batteries, one of the primary disadvantages is their relative instability, often resulting in these cells requiring special handling during fabrication, storage and use. Additionally, some cell chemistries, for example lithium-ion secondary cells, tend to be more prone to thermal runaway than other primary and secondary cell chemistries.

Thermal runaway occurs when the internal reaction rate of a battery increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

During the initial stages of a thermal runaway event, the cell undergoing runaway becomes increasingly hot due to the increased reaction rate and the inability of the system to withdraw the heat at a rapid enough rate. As the temperature within the cell increases, so does the pressure. While the safety pressure release vent built into many cells may help to release some of the gas generated by the reaction, eventually the increased temperature in concert with the increased internal cell pressure will lead to the formation of perforations in the cell casing. Once the cell casing is perforated, the elevated internal cell pressure will cause additional hot gas to be directed to this location, further compromising the cell at this and adjoining locations.

While the increase in cell temperature during a thermal runaway event is sufficient to damage materials in proximity to the event and to lead to the propagation of the event to adjoining cells, it is not until the hot gas escapes the confines of the cell, and potentially the confines of the battery pack, that the risk to people and property damage is significant. This is because while the event is confined, the gas generated by the event is primarily composed of carbon dioxide and hydrocarbon vapors. As a result, the autoignition temperature (AIT) of combustible materials in proximity to the event is relatively high. However, once this gas exits the confines of the cell/battery pack and comes into contact with the oxygen contained in the ambient atmosphere, the AIT of these same materials will decrease significantly, potentially leading to their spontaneous combustion. It is at this point in the event cycle that extensive collateral property damage is likely to occur and, more importantly, that the risks to the vehicle's passengers leaving the vehicle, or to first responders attempting to control the event, becomes quite significant.

Accordingly, it is desirable to control the point of egress of the hot gas to the ambient environment. The present invention provides a system and method for achieving this goal, thereby limiting collateral damage and the risk to first responders and others.

SUMMARY OF THE INVENTION

The present invention provides a thermal management system for minimizing the effects of thermal runaway occurring within one or more batteries contained within a sealed battery pack, the system including a battery venting assembly integrated into the sealed battery pack. In accordance with the invention, the battery venting assembly is comprised of an exhaust port integrated into an outer wall of the battery pack; a valve retention plate coupled to a surface of the outer battery pack wall, where the valve retention plate covers the exhaust port and includes a plurality of retention plate ports; and a plurality of valves configured to seal the plurality of retention plate ports, where each of the valves seals the corresponding retention plate port during normal operating conditions and unseals the corresponding retention plate port when an excess pressure arises within the battery pack due to one or more of the batteries within the pack entering into thermal runaway. Each valve is preferably fabricated from an elastomeric material, such as fluorosilicone, and preferably has a cracking pressure in the range of 0.5 to 1.0 psi. The sealed battery pack may be divided into a plurality of compartments, for example using a central battery pack member and a plurality of crossmembers, where the battery venting assembly is integrated into one of the plurality of sealed battery pack compartments.

In at least one embodiment, the valve retention plate is configured to unseal the battery pack exhaust port as hot gas passes through the plurality of retention plate ports during thermal runaway of one or more of the batteries within the battery pack. Preferably the valve retention plate is fabricated from a plastic material that melts and is ejected from the exhaust port as the hot gas passes through the retention plate ports during thermal runaway.

In at least one embodiment, a valve cover plate may be coupled to the external surface of the battery pack, the valve cover plate shielding the external surface of the valve retention plate and the external surface of each of the valves. A plurality of valve cover plate openings (e.g., perforations) allow air to pass through the valve cover plate, and thus allow the valves to operate as configured. Preferably a plurality of bolts attach the valve cover plate to the valve retention plate, where a region of the battery pack wall encircling the exhaust port is captured between a valve cover plate rim and a valve retention plate rim. Preferably the valve cover plate is fabricated from a plastic material that melts and is ejected as the hot gas passes through the retention plate ports during thermal runaway.

In at least one embodiment, a first portion of each valve is comprised of a retention plate port sealing member, e.g., an umbrella shaped member, and a second portion of each valve is comprised of a retention member, e.g., a barbed member, configured to be captured by a retention aperture in the corresponding retention plate port.

In at least one embodiment, the system also includes a ducted exhaust guide, for example fabricated from aluminum, an aluminum alloy, or steel, that is mounted within the battery pack and which surrounds and is spaced apart from at least a portion of the inside surface of the valve retention plate. The ducted exhaust guide is configured to direct the flow of hot gas and material expelled during thermal runaway through the plurality of retention plate ports to the ambient environment, for example directing the flow of gas and material in a forward direction and away from the vehicle in which the battery pack is incorporated. Preferably at least a portion of the ducted exhaust guide is angled away from the inside surface of the battery pack at an angle of between 10 and 40 degrees, and more preferably at an angle of between 15 and 30 degrees.

In at least one embodiment, the battery pack enclosure includes a two way pressure equalization valve that has a cracking pressure less than that of the valves used in the battery venting assembly.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a non-plug-in hybrid vehicle, also referred to as a HEV, where a hybrid vehicle utilizes multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

When a single battery within a battery pack undergoes thermal runaway, the thermal energy generated by the event can have far-reaching consequences. First, due to the increase in temperature and the related release of hot gas and materials, the temperature of other cells within close proximity to the initially affected cell may increase sufficiently to cause them to enter into a state of thermal runaway which, in turn, may lead to other cells entering into thermal runaway. Therefore the initial thermal event may propagate throughout the battery pack, leading to a much larger thermal event within the pack. Second, as the cell or cells within the pack enter into thermal runaway, the associated increase in pressure may lead to a catastrophic failure of the battery pack enclosure. Unless the battery pack enclosure includes one or more failure points that have been designed to fail at a predetermined pressure, the point of failure will be unknown, resulting in increased risk to passengers, bystanders and first responders depending upon where the random failure point occurs. Third, if the temperature of the gas and material escaping from the battery pack is not lowered prior to its release, the ATI of the combustible materials in proximity to the release point may decrease significantly, potentially leading to their spontaneous combustion. Thus if the egress point is located near a passenger, bystander or first responder, the consequences may be disastrous.

Figure 1:
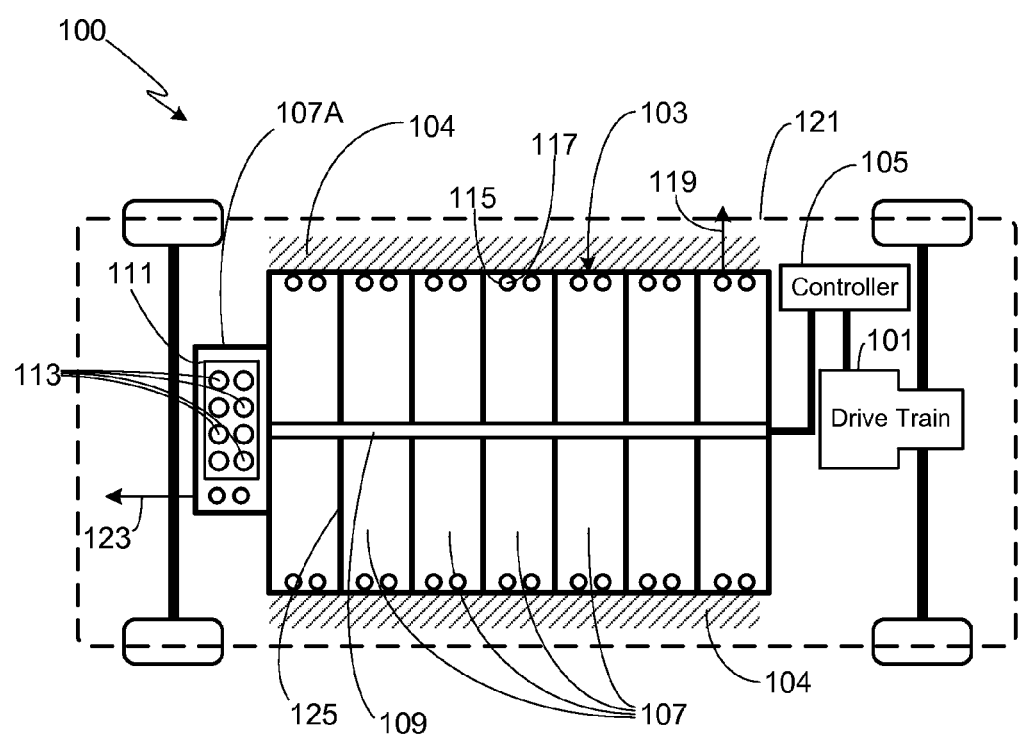
FIG. 1 illustrates the basic elements of a battery pack system designed to control the release of hot gas and material from a thermal event occurring within a portion of the battery pack.

To overcome these problems, and as schematically illustrated in FIG. 1, the present invention controls the location and direction where hot gas and material is released during a thermal runaway event. Additionally, the invention controls the exchange of thermal energy between regions of the battery pack, thereby helping to prevent a single thermal runaway event from spreading throughout the entire pack and potentially causing catastrophic damage to the vehicle and its surroundings. Although the system is shown implemented in an electric vehicle, i.e., electric vehicle 100, it should be understood that the illustrated concepts and structures may be used with other systems utilizing a large battery pack (e.g., boats, residential or commercial battery systems, etc.). For illustration purposes, the drive system shown in FIG. 1 uses a single electric motor coupled to the drive axle via a transmission/differential assembly, i.e., drive train 101. It will be appreciated that the invention is equally applicable to vehicles using multiple motors coupled to one or both axles. Similarly, the invention is not limited to a specific type/configuration of transmission (e.g., single speed, multi-speed) or a specific type/configuration of differential (e.g., open, locked or limited slip).

Drive train 101 is coupled to battery pack 103 via a power control module 105, module 105 typically including a DC to AC converter. Power control module 105 insures that the power delivered to the electric motor has the desired voltage, current, waveform, etc. As such, power control module 105 may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc.

Battery pack 103, which is preferably mounted to the vehicle's undercarriage 104, is comprised of a plurality of batteries that are segregated into a plurality of battery pack compartments 107. In the pack shown in FIG. 1 there are fifteen battery pack compartments 107, fourteen of which are in a side-by-side configuration with the fifteenth compartment (labeled 107A) centered at the front of the pack. Note that a central battery pack member 109, also referred to herein as a battery pack spine, separates the left and right compartments as well as providing a convenient means for running power lines, data lines, etc. The battery pack compartments are sealed from one another, both in terms of thermal energy and gaseous exchange, thus helping to prevent a thermal runaway event occurring within one battery pack compartment from propagating to an adjoining compartment. In at least one embodiment, each battery pack compartment includes a plurality of batteries that are contained within a battery module. Preferably each battery pack compartment includes only a single module, although in some configurations multiple battery modules may be contained within a single battery pack compartment. For example, front compartment 107A may house either a single module, or a pair of modules stacked one above the other. An exemplary module 111 is shown in front battery pack compartment 107A, where module 111 contains multiple individual batteries 113. Preferably the battery modules contained within each battery compartment are the same, thus simplifying module manufacturing and assembly. Modules 111 are not sealed, but rather designed to breath, thus insuring that the hot gas and material generated during thermal runaway quickly exit the module, thereby minimizing the risk of event propagation.

As previously noted, the number of batteries per module, or per battery pack compartment, depends upon the needs of the electric vehicle, the energy density of the individual batteries, etc. The use of battery modules simplifies manufacturing and repair as well as providing a convenient approach to electrically interconnecting the batteries and, in some instances, cooling the batteries. It will be appreciated that the number of batteries within a battery pack compartment 107/107A and the overall size of the battery pack 103 depends on the energy capabilities of the selected batteries as well as the requirements placed on the batteries by the vehicle or other application.

In accordance with the invention, each battery pack compartment includes one or more gas exhaust ports 115 that are designed to activate during a battery thermal runaway event. Each port 115 is sealed, for example using a valve 117, which prevents contaminants such as road debris and moisture from entering the battery pack, but is designed to open during a thermal runaway event in order to provide a controlled exhaust pathway for the hot gas and materials expelled during runaway. Preferably the battery pack also includes one or more two-way pressure equalization valves (not shown) that have a crack pressure much less than valves 117 (e.g., 0.25 psi versus 0.7 psi for valves 117), thus providing a means for handling pressure differentials due to non-thermal events (e.g., due to changes in atmospheric pressure).

In the side-by-side battery compartments, sealed ports 115 are mounted near the outer edges of the battery pack in order to minimize the length of the exhaust path 119 coupling each exhaust port to the ambient environment falling outside the envelope 121 of the vehicle. In the forward, central battery compartment (e.g., compartment 107A), preferably an exhaust guide is used to direct the flow forward along exhaust path 123, thereby minimizing the risk of hot gas and material expelled from the forward compartment heating the rearward battery compartments. Additionally, minimizing pathways 119/123 lower the risk of the gas and material exhausted during runaway igniting the car which, in turn, lowers the risk to the passengers. Furthermore, by including one or more exhaust ports 115 within each battery pack compartment 107/107A and segregating battery pack compartments using internal battery pack walls 125 (also referred to herein as battery pack cross-members) and central battery pack member 109, the risk of overheating the batteries within other battery compartments is minimized.

During a thermal runaway event, for example one arising in one or more of the illustrated batteries 113 within the front battery pack compartment, the gas and material generated by the event easily passes out of the module since the modules, as noted above, are not designed to contain the event, or even prevent moderate pressure changes. As the pressure within the compartment (e.g., compartment 107A) containing the cell undergoing thermal runaway increases, one or more of the valves within that compartment open. Once valve or valves 117 open, the heated gas from the thermal event is exhausted out of the battery pack. In at least one embodiment, each valve and port assembly is designed as a two stage valve that provides increased throughput as the thermal event grows and generates more gas and material. Preferably an exhaust guide is used to guide the exhausted gas and material away from the vehicle.

Figure 2:
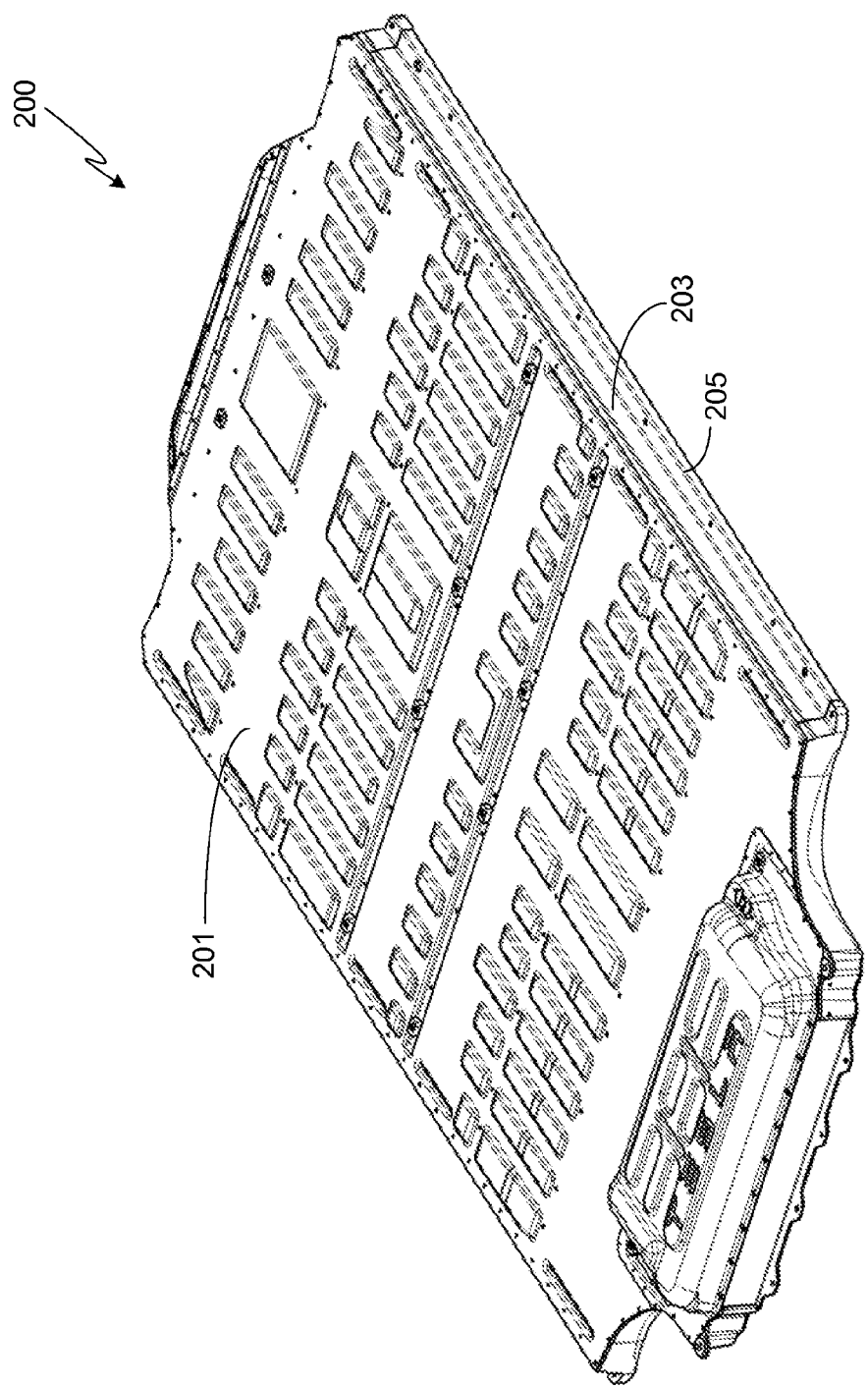
FIG. 2 provides a perspective view of a battery pack in accordance with the invention.

FIG. 2 provides a perspective view of a battery pack 200 in accordance with the invention. In this view, the battery pack is shown closed by a top member 201. Preferably side structural members 203 include an extended region or lip 205 which is used to mechanically and thermally couple the side members 203, and thus the battery pack, to the vehicle structure (not shown).

Figure 3:
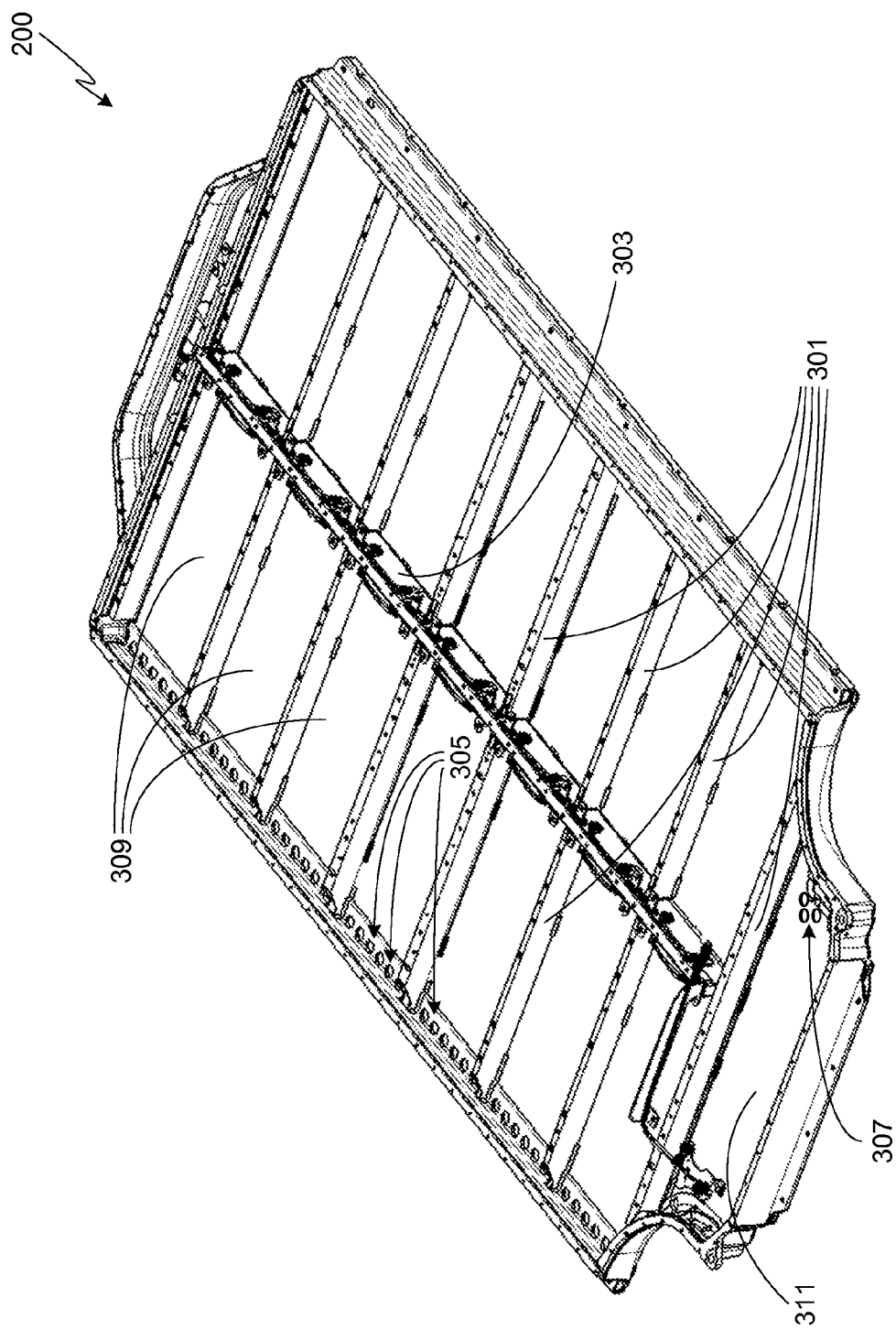
FIG. 3 provides a perspective view of the battery pack shown in FIG. 2, with the top member removed.

FIG. 3 shows battery pack 200 with top member 201 removed. In this view the internal battery pack cross-members 301 are visible as well as the central member 303 and multiple exhaust port/valve assemblies 305 and 307. In a preferred embodiment, each side-by-side battery pack compartment 309 includes 6 exhaust port/valve assemblies 305 while the front, central battery pack compartment 311 includes 3 exhaust port/valve assemblies 307 that are integrated into a larger exhaust port as described in detail below. Each exhaust port of assemblies 305 and 307 has a diameter of approximately 26 millimeters. As shown, member 303 is preferably centered, running lengthwise through the pack and substantially orthogonal to cross-members 301. As previously noted, cross-members 301 and central member 303 segregate the battery pack compartments from one another, thereby limiting event propagation by providing a thermal barrier between groups of cells or battery modules as well as significantly limiting, if not altogether eliminating, gas flow between battery pack compartments. Members 301 and 303 also add to battery pack strength and stiffness. Furthermore, assuming that the battery pack is integrated into the vehicle's structure, for example as disclosed in co-pending U.S. patent application Ser. No. 13/308,300, filed 30 Nov. 2011, members 301/303 and the overall battery pack may be used to improve vehicle performance (e.g., vehicle stiffness, vehicle impact resistance, etc.).

It will be appreciated that there are a variety of ways in which members 301/303 may be designed in order to provide strength and present a thermal barrier between compartments. For example, internal cross-members 301 may be hollow, thus achieving the desired rigidity and strength with minimal weight. In at least one embodiment, members 301 are fabricated from aluminum or an aluminum alloy using an extrusion process. Other materials may also be used (e.g., steel). It will be appreciated that variations on the preferred and illustrated configuration may be used, depending upon both the thermal and mechanical design goals set for the cross-members. For example, rather than utilize a metal, cross-members 301 may be comprised of a high melting temperature, low thermal conductivity material (e.g. a ceramic). Alternately, the lumens within cross-members 301 may be filled with a high melting temperature, low thermal conductivity material (e.g., fiberglass or similar materials). Alternately, the lumens within the cross-members may include a liquid (e.g., water), the liquid being either stagnant or flowing. If stagnant, the liquid may be contained within the lumens themselves or, as preferred, contained within pouches that fit within the lumens. If the liquid is flowing, it is preferably contained within tubing that is inserted within the cross-member lumens and either coupled to a battery cooling system or used in a stand-alone circulation system.

Figure 4:
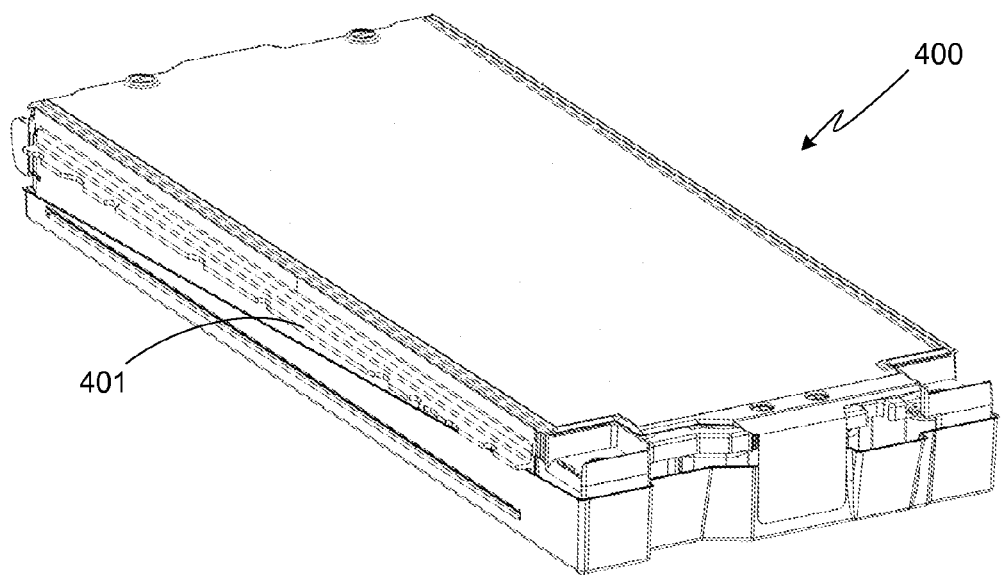
FIG. 4 provides a perspective views of a single battery module for use within a battery pack such as that shown in FIGS. 2 and 3.
Figure 5:
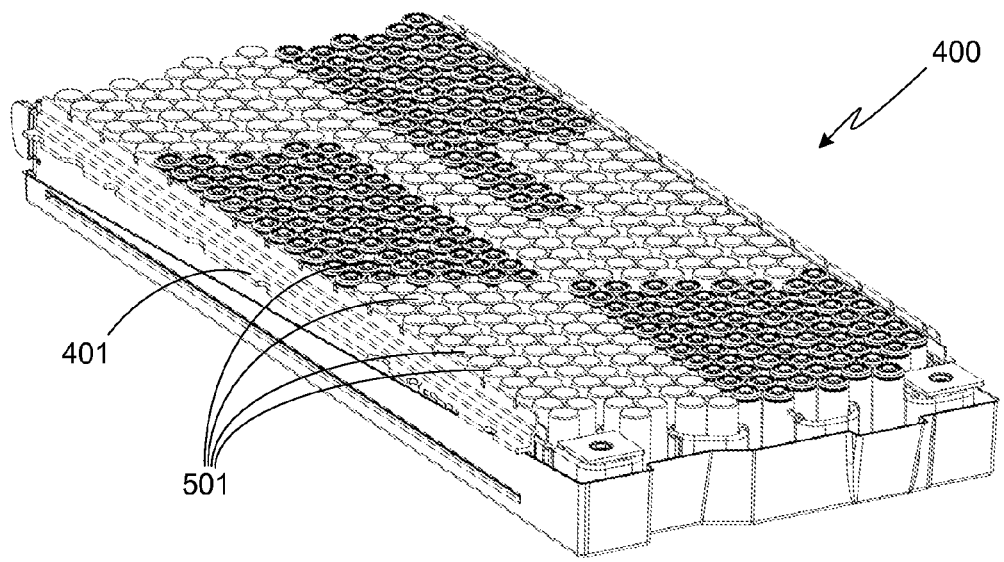
FIG. 5 illustrates the battery module shown in FIG. 4 with the upper module components removed.
Figure 6:
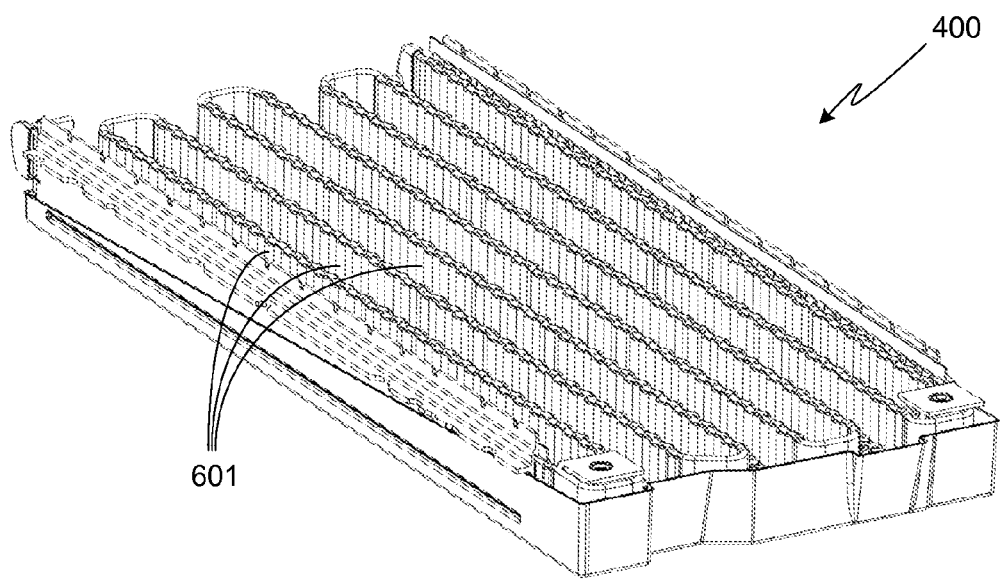
FIG. 6 illustrates the battery module shown in FIGS. 4 and 5 with the batteries removed.

As previously noted, the present invention does not rely on a particular implementation of the battery pack and more specifically, does not rely on a particular implementation of the batteries and battery modules that are contained within the battery pack. Specific implementations are only provided herein to illustrate one preferred configuration. FIG. 4 provides a perspective view of a single module 400, this view highlighting the module mounting flange 401. In this configuration, mounting flanges 401 are located on either side of the module and, during battery pack assembly, are captured between the lower cross-member (e.g., cross-members 301) and an upper cross-member. FIG. 5 shows a different view of battery module 400 in which the upper portion of the module has been removed as well as several of the upper module components (e.g., cell locator plate, current collector plate, etc.). By removing the upper portion of module 400, the individual cells 501 within are visible. Note that the orientation of cells 501 within module 400 varies in the illustrated configuration. In the illustrated embodiment, each module 400 contains 370 individual cells, each cell utilizing an 18650 form factor. It should be understood, however, that this is only an exemplary configuration and that the invention may be utilize batteries with a different form factor, a larger or smaller number of cells, different cell chemistries, etc. FIG. 6 provides a similar view to that of FIG. 5, with the exception that cells 501 have been removed. With the removal of cells 501, battery cooling conduits 601 are visible, conduits 601 being coupled to the battery pack thermal management system (not shown).

Figure 7:
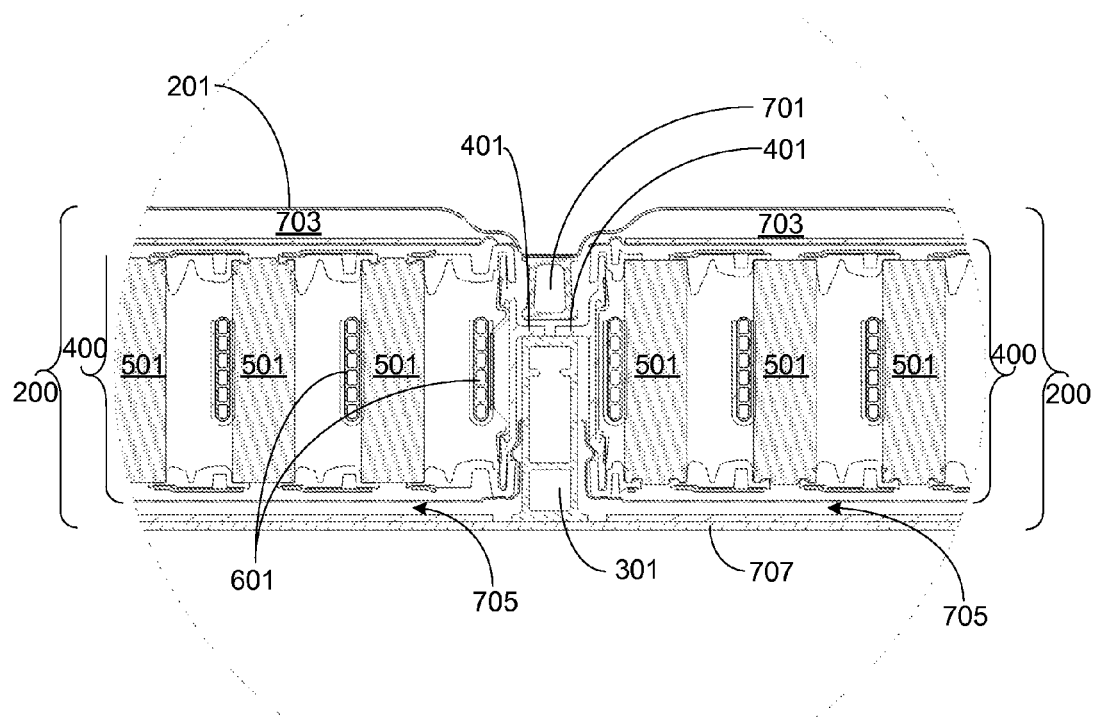
FIG. 7 provides a detailed cross-sectional view of a portion of a battery pack that illustrates gas flow pathways above and below the mounted battery modules.

The modules within the individual battery compartments (e.g., compartments 309 and 311) are preferably mounted to provide air flow pathways both above and below each module. The air space above and below the modules insure that regardless of the location of a thermal runaway event, there is a clear pathway to the exhaust port within the corresponding battery compartment. A preferred module mounting configuration is shown in the detailed cross-section of FIG. 7, this view illustrating the integration and mounting of modules 400 within side-by-side compartments of pack 200. Note that due to the plane used for purposes of this cross-section, and due to the staggering of batteries in this embodiment as illustrated in FIG. 5, the cells mounted to the left side of each cooling conduit 601 are not visible in this figure. In the illustrated configuration, module mounting flanges 401 are shown captured between lower cross-member 301 and an upper cross-member 701, the upper and lower cross-members providing a simple means of locating and holding the module in place within the battery pack. As a result of this mounting configuration, there is an air space 703 between the modules 400 and battery pack top member 201, and a similar air space 705 between modules 400 and battery pack bottom member 707.

Figure 8:
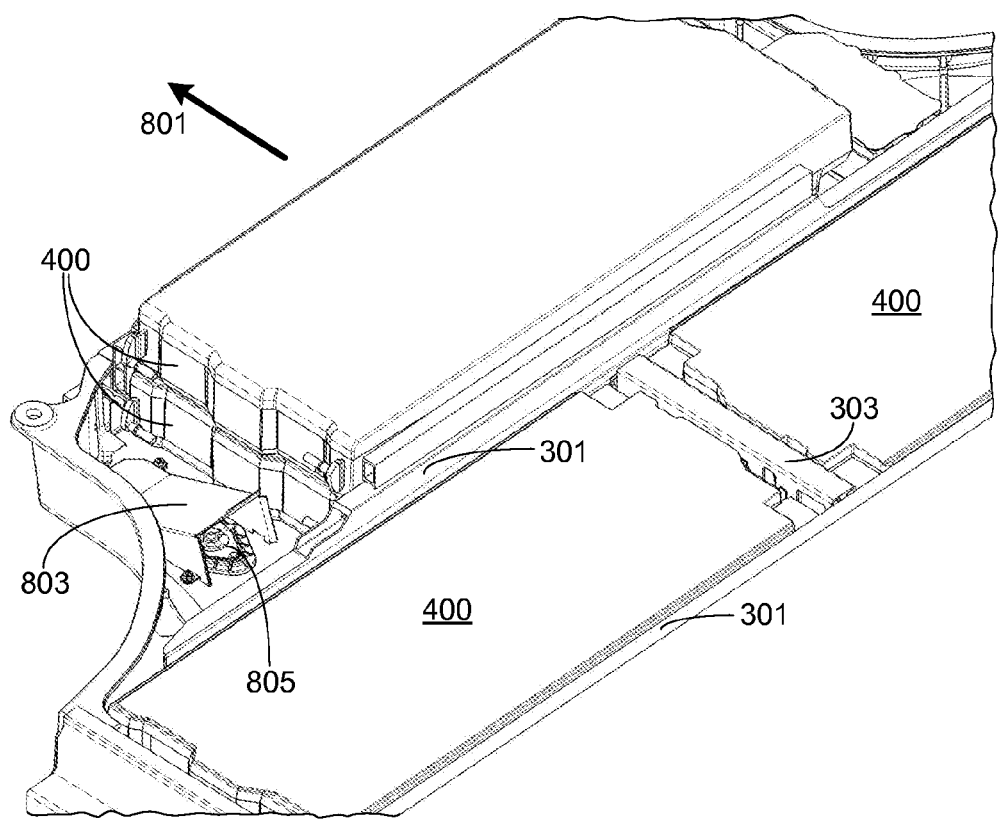
FIG. 8 provides a perspective view of the forward portion of the battery pack shown in FIGS. 2 and 3.

FIG. 8 provides a perspective view of the inside of the forward portion of battery pack 200. In this view, arrow 801 points towards the front of the battery pack and the vehicle in which pack 200 is mounted. Partially visible in this figure are multiple battery modules 400, two in a side-by-side arrangement and two in a stacked arrangement within battery compartment 311. In the forward left corner of compartment 311 is an exhaust duct 803 that covers the exhaust port and the valve assembly 805 in battery compartment 311.

FIGS. 9-13 provide various views of the exhaust port and valve assembly 805 used in central, forward battery compartment 311 of the preferred embodiment of the invention. These views do not include an exhaust guide, such as duct 803. Preferably battery compartment 311 only includes a single port/valve assembly, which is mounted to one side of the compartment as shown, this asymmetrical configuration helping to direct the flow of hot gas and material expelled during a thermal runaway event within the forward compartment to one side of the vehicle, thereby maintaining the second side of the vehicle for passenger egress.

Figure 9:
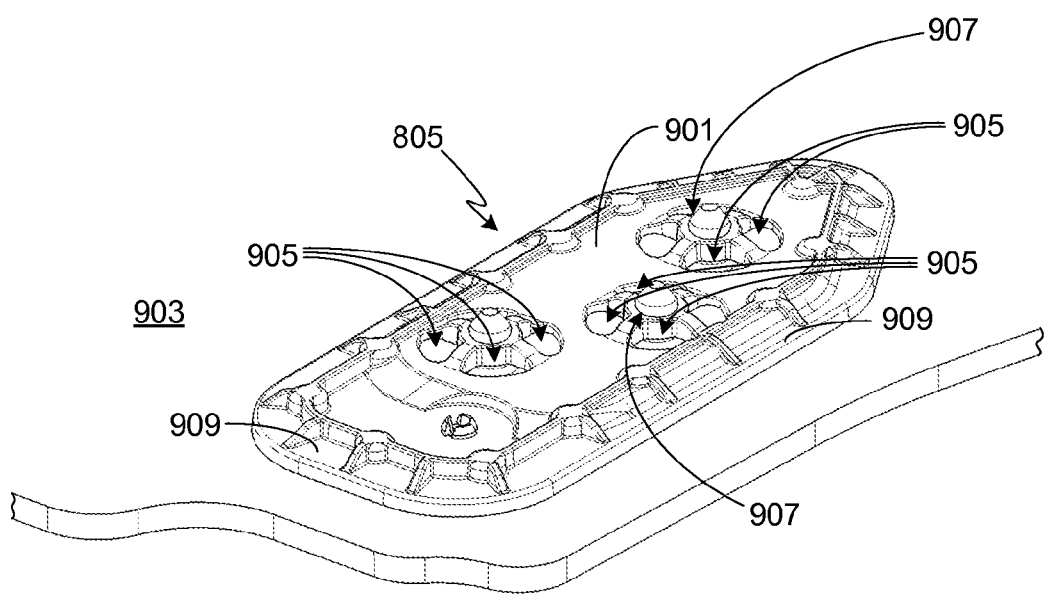
FIG. 9 provides a detailed view of the valve retainer positioned on the inside surface of the bottom battery pack panel.
Figure 10:
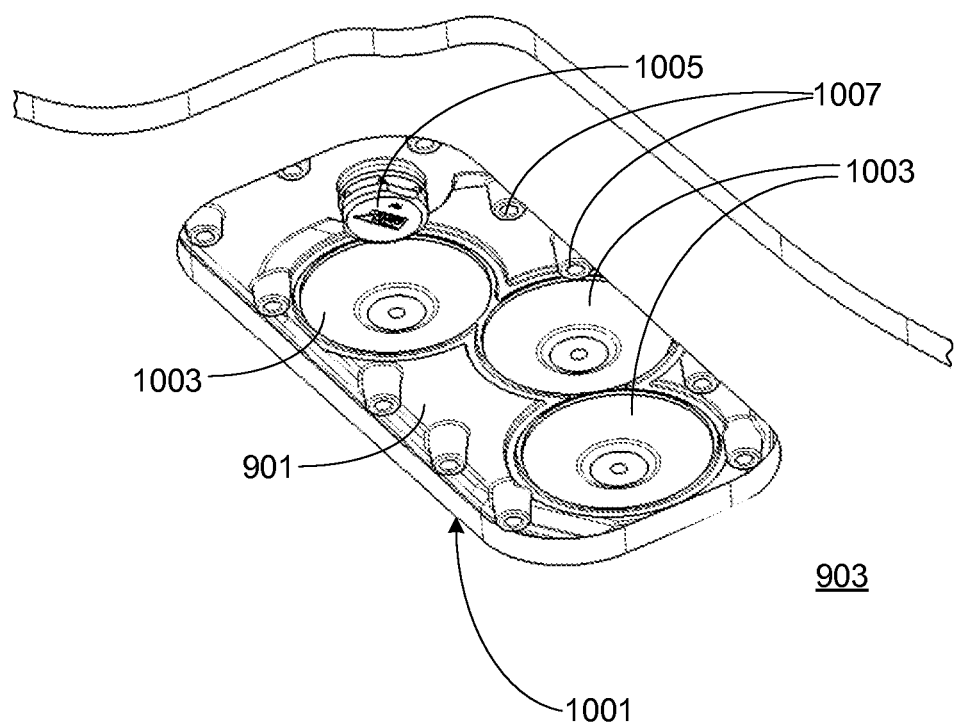
FIG. 10 provides a detailed view of the valve retainer of FIG. 9, this view showing the external surface of the uncovered retainer with the valves in place.

FIGS. 9 and 10 provide inside and outside views, respectively, of valve retention carrier 901 located in exhaust port 1001. In this embodiment, exhaust port 1001 is an aperture 64 millimeters by 145 millimeters cut/milled into bottom battery pack panel 903. Valve retention carrier 901, also referred to herein as a valve retention plate or member, is preferably configured to hold three valves 1003 in place during normal operation. Valves 1003 are also referred to herein as sealing members or umbrella valves. Also visible in FIG. 10 is a two-way pressure equalization valve 1005 that has a crack pressure much less than valves 1003 (e.g., 0.25 psi versus 0.7 psi for valves 1003), thus providing a means for handling pressure differentials due to non-thermal events (e.g., changes in atmospheric pressure).

Figure 11:
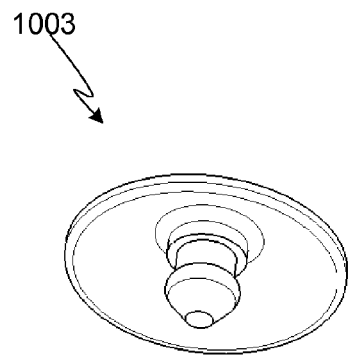
FIG. 11 provides a perspective view of a retention plate port seal.
Figure 12:
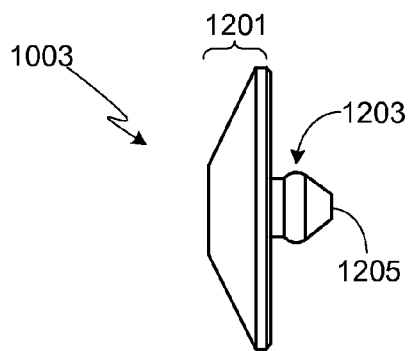
FIG. 12 provides a side view of the retention plate port seal shown in FIG. 11.

FIGS. 11 and 12 provide perspective and side views, respectively, of umbrella valves 1003. During normal use, valves 1003 are designed to seal three retention plate ports, each of which includes a set of apertures 905. In the illustrated embodiment each retention plate port is comprised of four apertures 905. By sealing these apertures, road debris, moisture and other contaminants are prevented from entering the battery pack. Preferably valves 1003 are fabricated from an elastomer, such as fluorosilicone, that is resistant to solvents, oils and other contaminants and is capable of providing a good seal when compressed against the sealing surface of retention plate 901. In this embodiment, each seal 1003 is comprised of an outer umbrella-like portion 1201 that may be compressed against the sealing surface of retention plate 901. Portion 1201 has a diameter on the order of 35 millimeters which, assuming an exhaust port diameter on the retention plate of approximately 26 millimeters, is large enough to prevent the umbrella valves from inverting during a negative pressure differential. The second portion of each seal 1003 includes a barb 1203 that is configured to be captured within an aperture 907 on carrier 901. Preferably the tip 1205 of barb 1203 is somewhat pointed, thus allowing it to be easily inserted into carrier aperture 907.

Figure 13:
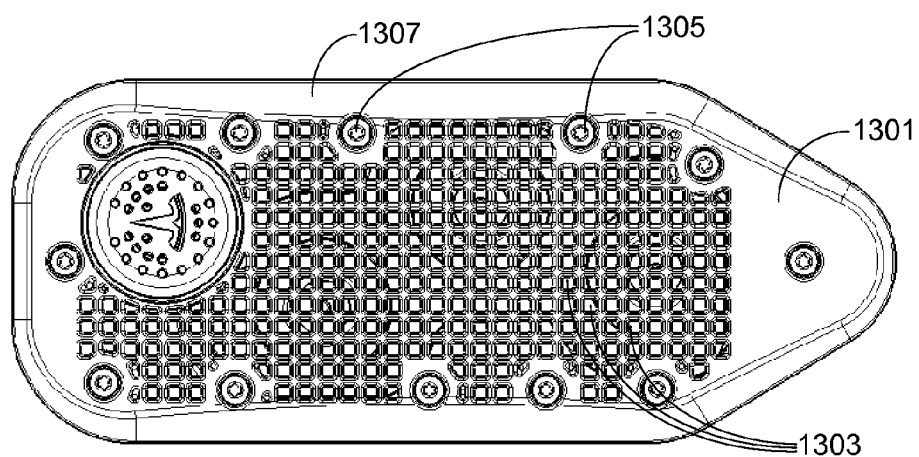
FIG. 13 provides an external battery pack view of the perforated valve assembly cover.

In the preferred embodiment, attached to the outside surface of battery pack 200, specifically to bottom battery pack panel 903, is a perforated cover plate 1301 (shown in FIG. 13). Cover plate 1301 protects valves 1003 from accidental damage and abuse, for example due to road debris or other road hazards, which might otherwise occur. Cover plate 1301 includes a plurality of perforations 1303, thus insuring that air can flow through the valve assembly whenever the valves open. It will be appreciated that plate 1301 can also utilize slots or other configurations that provide air flow through the assembly. While retention plate 901 and cover plate 1301 can utilize snap-fit features to hold them in place, preferably mechanical couplers that are more resistant to vibration are used. For example, in the illustrated assembly, cover plate 1301 is attached to valve retention plate 901 using a plurality of bolts 1305 that are screwed into receivers 1007 on plate 901. In this configuration, bottom pack panel 903 is captured between a lip or extended region 909 on valve retention plate 901, and a lip or extended region 1307 on cover plate 1301.

Figure 14A:
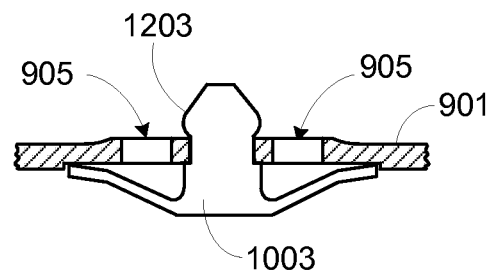
FIGS. 14A-14C illustrate the initial venting stages of the seals illustrated in FIGS. 9-12.
Figure 14B:
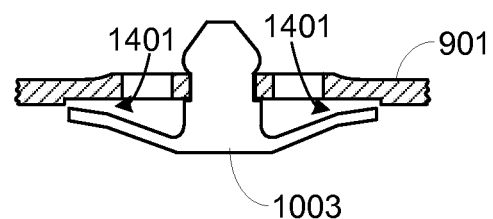
Figure 14C:
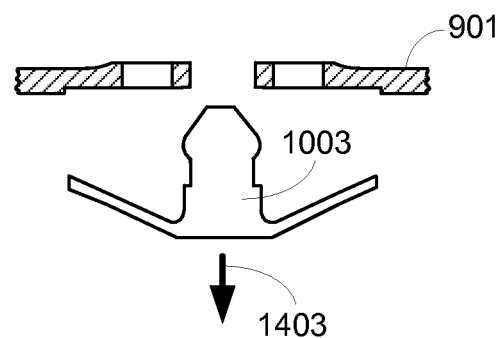

In the cross-sectional view of FIG. 14A, one of the umbrella valves 1003 is shown captured within the corresponding portion of valve retention plate 901. Note that in this view, neither bottom battery pack panel 903 nor cover plate 1301 are shown. During the initial stages of a thermal runaway event within the module(s) contained in front battery pack compartment 311, once the valves' crack pressure (e.g., 0.7 psi) is reached one or more of the flexible umbrella valves 1003 will expand slightly away from the sealing surface of retention plate 901. As a result, air will flow out of the pack along pathways 1401 as illustrated in FIG. 14B. If the pressure then equilibrates, for example as would be expected if the pressure increase was a transient event, then umbrella valve 1003 would reseal, i.e., return to the state shown in FIG. 14A. If, on the other hand, the change in pressure is due to the initial stage of a thermal runaway event, then the internal battery compartment pressure will continue to increase, often accompanied by pressure spikes, which will often lead to seal 1003 being pushed completely out of the pack along pathway 1403 as shown in FIG. 14C. Although not shown, at this stage note that seal 1003 may be held somewhat in place by cover plate 1301. As hot gas and material flow past seals 1003, cover plate 1301 and retention plate 901, both fabricated from polypropylene or other plastic, melt (or ignite) and are pushed out of large exhaust port 1001, thereby substantially increasing the flow path for exhausting thermal runaway hot gas and material from the affected battery pack compartment. Accordingly, in a typical thermal runaway event, the preferred embodiment of the present invention provides a multi-stage vent, wherein during the first stage the seals open and during the subsequent stages the cover plate and valve retention plate are ejected from the port.

As previously noted, the intent of the present invention is to insure that during a thermal runaway event, hot gas and debris are ejected away from the battery pack and the vehicle, thereby helping to minimize collateral damage from the event and prevent event propagation throughout the rest of the pack. Accordingly, in a preferred embodiment of the invention an exhaust guide is used to aid in directing the flow of gas and material in the intended direction.

Figure 15:
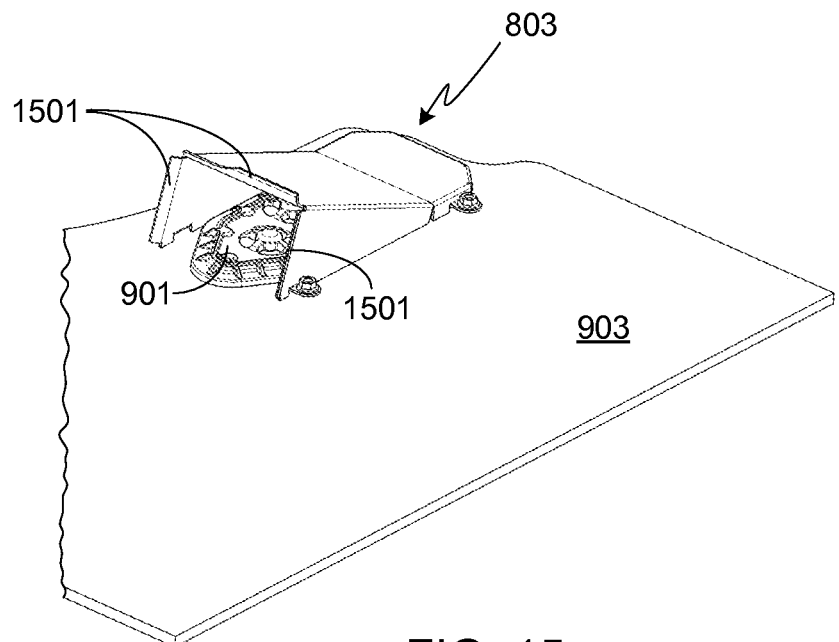
FIG. 15 provides a perspective view of a preferred exhaust guide mounted within the battery pack.
Figure 16:
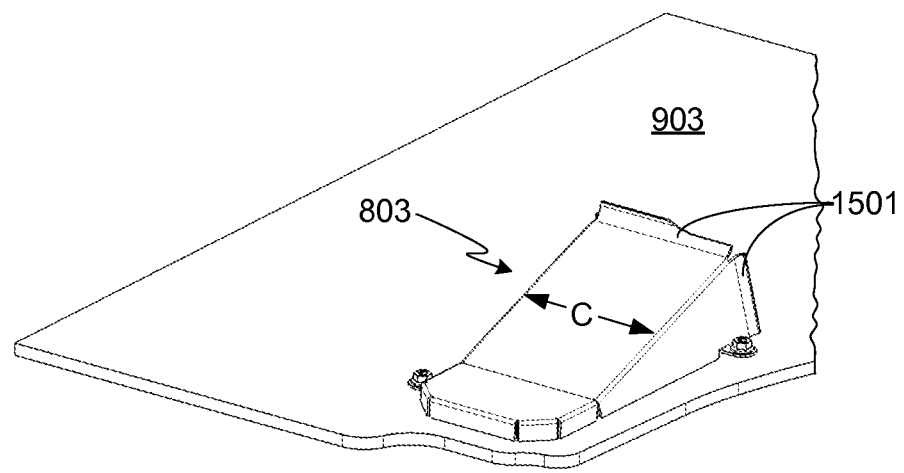
FIG. 16 provides an alternate perspective view of the preferred exhaust guide shown in FIG. 15.
Figure 17:
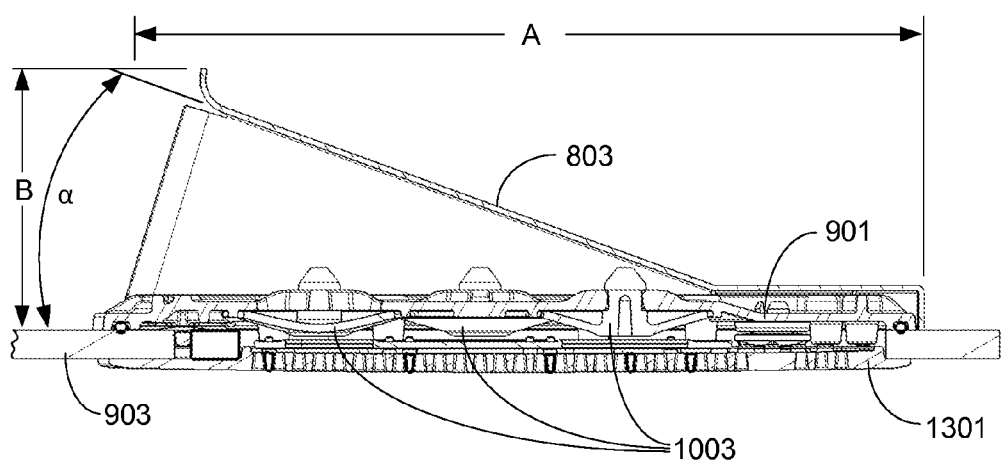
FIG. 17 provides a cross-sectional view of the mounted exhaust guide shown in FIGS. 15 and 16.

In the preferred embodiment, the exhaust guide is comprised of a duct, preferably fabricated from aluminum, an aluminum alloy, or steel, that is mounted inside of battery compartment 311 as shown in FIG. 8. Internal battery pack mounting is preferred to prevent possible duct damage from road debris, and to insure that the duct does not impact air flow, and thus vehicle efficiency, during normal vehicle use. FIG. 15 provides a perspective view of duct 803 that shows the open end of the duct while FIG. 16 provides a similar view from the rear of the duct. FIG. 17 provides a cross-sectional view of duct 803, mounted to bottom battery pack panel 903. Note that the leading edges 1501 of the duct opening are preferably bent outwards as shown. Duct 803 preferably has a duct angle α, measured from surface 903, of between 10 and 40 degrees, more preferably between 15 and 30 degrees, and still more preferably around 20 degrees. The illustrated and preferred embodiment is approximately 180 millimeters long (i.e., dimension "A" in FIG. 17), approximately 60 millimeters high (i.e., dimension "B" in FIG. 17), and approximately 90 millimeters in width (i.e., dimension "C" in FIG. 16). Note that angling the duct in the direction shown promotes gas flow in a forward direction, as desired.

While the rigid, internally mounted exhaust duct shown in FIGS. 15-17 is preferred, as previously noted other configurations may be used with the invention. For example, an externally mounted duct may be used, especially if the duct may be positioned such that the duct opening is facing rearwards, thus minimizing its effect on vehicle drag. Such a rear aiming duct could be potentially used, for example, if the central battery pack compartment is located at the rear of the vehicle rather than the front. In another alternate configuration, a drop-down duct may be used, i.e., a duct that is normally flat relative to the bottom of the battery pack, but then opens to the desired exhaust angle once hot gas and material begin to flow through the exhaust port (e.g., port 1001). A drop-down duct is not preferred, however, due to the risk of it not opening during a thermal runaway event, for example due to damage incurred during a vehicle collision.

It will be appreciated that while the description and figures provided above describe a preferred embodiment, the inventors envision that other configurations may employ the same concepts as a means of controlling the flow of hot gas generated during a thermal event occurring within a battery pack. The specifics of the present configuration are clearly due, at least in part, on the size of the battery pack, the location of the battery pack within the vehicle, and the location of the battery pack relative to the passenger compartment, drive train components, and other vehicle structures. Therefore, depending upon the design of the vehicle or other application for which the battery pack is intended as well as the specifics of the battery pack itself, the present invention may be embodied in other specific forms without departing from the spirit or essential characteristics thereof. Accordingly, the disclosures and descriptions herein are intended to be illustrative, but not limiting, of the scope of the invention which is set forth in the following claims.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention

What is claimed is:

1. A battery pack thermal management system, comprising:
    a sealed battery pack enclosure configured to hold a plurality of batteries; and
    a battery venting assembly integrated into said sealed battery pack enclosure, wherein said battery venting assembly is comprised of:
    an exhaust port integrated into an outer wall of said sealed battery pack enclosure;
    a valve retention plate coupled to a surface of said outer wall of said sealed battery pack enclosure, wherein said valve retention plate covers said exhaust port, and wherein said valve retention plate is comprised of a plurality of retention plate ports; and
    a plurality of valves configured to seal said plurality of retention plate ports, wherein each of said plurality of valves seals said corresponding retention plate port under normal operating conditions and unseals said corresponding retention plate port when an excess pressure arises within said sealed battery pack enclosure, said excess pressure due to one or more of said plurality of batteries entering into thermal runaway,
    wherein a first portion of each valve of said plurality of valves is comprised of a retention plate port sealing member, and wherein a second portion of each valve of said plurality of valves is comprised of a retention member configured to be captured within a retention aperture corresponding to each retention plate port.

2. The battery pack thermal management system of claim 1, wherein said sealed battery pack enclosure is divided into a plurality of sealed battery pack compartments, wherein said plurality of batteries are divided among said plurality of sealed battery pack compartments, and wherein said battery venting assembly is integrated into one of said plurality of sealed battery pack compartments.

3. The battery pack thermal management system of claim 2, said sealed battery pack enclosure further comprising a central battery pack member and a plurality of cross-members integrated within said sealed battery pack enclosure, wherein said central battery pack member and said plurality of cross-members divide said sealed battery pack enclosure into said plurality of sealed battery pack compartments, and wherein said central battery pack member and each of said plurality of cross-members presents a thermal barrier to the transfer of thermal energy between said sealed battery pack compartments.

4. The battery pack thermal management system of claim 1, wherein said valve retention plate is configured to unseal said exhaust port of said sealed battery pack enclosure as hot gas passes through said plurality of retention plate ports during said thermal runaway of one or more of said plurality of batteries.

5. The battery pack thermal management system of claim 4, wherein said valve retention plate is fabricated from a plastic material, and wherein said valve retention plate melts and is ejected from said exhaust port of said sealed battery pack enclosure as hot gas passes through said plurality of retention plate ports during said thermal runaway of one or more of said plurality of batteries.

6. The battery pack thermal management system of claim 5, further comprising a valve cover plate fabricated from a plastic material and coupled to an external surface of said outer wall of said sealed battery pack enclosure, wherein said valve retention plate is coupled to an internal surface of said outer wall of said sealed battery pack enclosure, wherein said valve cover plate shields an external surface of said valve retention plate and an external surface of each of said plurality of valves, wherein said valve cover plate is comprised of a plurality of openings, and wherein said valve cover plate melts and is ejected as hot gas passes through said plurality of retention plate ports during said thermal runaway of one or more of said plurality of batteries.

7. The battery pack thermal management system of claim 1, further comprising a valve cover plate coupled to an external surface of said outer wall of said sealed battery pack enclosure, wherein said valve retention plate is coupled to an internal surface of said outer wall of said sealed battery pack enclosure, wherein said valve cover plate shields an external surface of said valve retention plate and an external surface of each of said plurality of valves, and wherein said valve cover plate is comprised of a plurality of openings.

8. The battery pack thermal management system of claim 7, further comprising a plurality of bolts attaching said valve cover plate to said valve retention plate, wherein a region of said outer wall encircling said exhaust port is captured between a rim of said valve cover plate and a rim of said valve retention plate when said valve cover plate is attached to said valve retention plate with said plurality of bolts.

9. The battery pack thermal management system of claim 7, said plurality of openings comprised of a plurality of cover plate perforations.

10. The battery pack thermal management system of claim 1, wherein said first portion of each valve of said plurality of valves is umbrella shaped and wherein said second portion of each valve of said plurality of valves is further comprised of a barbed member configured to be captured within said retention aperture corresponding to each retention plate port.

11. The battery pack thermal management system of claim 1, wherein each valve of said plurality of valves is fabricated from an elastomeric material.

12. The battery pack thermal management system of claim 11, wherein said elastomeric material is comprised of a fluorosilicone.

13. The battery pack thermal management system of claim 1, further comprising a ducted exhaust guide, wherein said ducted exhaust guide is mounted within said sealed battery pack enclosure, wherein said ducted exhaust guide surrounds and is spaced apart from at least a portion of an inside surface of said valve retention plate, and wherein said ducted exhaust guide is configured to direct hot gas and material expelled from within said sealed battery pack enclosure through said plurality of retention plate ports to an ambient environment during thermal runaway.

14. The battery pack thermal management system of claim 13, wherein said ducted exhaust guide is configured to direct said hot gas and material expelled from within said sealed battery pack enclosure in a forward direction away from a vehicle centerline during thermal runaway, wherein said vehicle centerline corresponds to a vehicle, and wherein said sealed battery pack enclosure is incorporated into said vehicle.

15. The battery pack thermal management system of claim 13, wherein at least a portion of said ducted exhaust guide is angled away from an inside surface of said outer wall of said sealed battery pack enclosure at an angle of between 10 and 40 degrees.

16. The battery pack thermal management system of claim 15, wherein said angle is between 15 and 30 degrees.

17. The battery pack thermal management system of claim 13, wherein said ducted exhaust guide is fabricated from a material selected from the group of materials consisting of aluminum, aluminum alloys and steel.

18. The battery pack thermal management system of claim 1, wherein each valve of said plurality of valves has a cracking pressure in the range of 0.5 to 1.0 psi.

19. The battery pack thermal management system of claim 1, said sealed battery pack enclosure further comprising at least one two-way pressure equalization valve, wherein said two-way pressure equalization valve has a first cracking pressure and each valve of said plurality of valves has a second cracking pressure, wherein said first cracking pressure is less than said second cracking pressure.

* * * * *